May 23, 1933.  O. E. TROBECK  1,910,192
AUTOMATIC MULTIPLE SPINDLE MACHINE
Filed Dec. 24, 1930    6 Sheets-Sheet 1

Fig.1.

INVENTOR
Olof Enoch Trobeck
BY

ATTORNEY

May 23, 1933.　　　　O. E. TROBECK　　　　1,910,192
AUTOMATIC MULTIPLE SPINDLE MACHINE
Filed Dec. 24, 1930　　　6 Sheets-Sheet 2

INVENTOR
Olof Enoch Trobeck
BY
ATTORNEY

May 23, 1933.  O. E. TROBECK  1,910,192
AUTOMATIC MULTIPLE SPINDLE MACHINE
Filed Dec. 24, 1930   6 Sheets-Sheet 3

Fig. 5.

INVENTOR

ATTORNEY

Patented May 23, 1933

1,910,192

UNITED STATES PATENT OFFICE

OLOF ENOCH TROBECK, OF BERLIN, GERMANY, ASSIGNOR TO NATIONAL ACME COMPANY, OF CLEVELAND, OHIO, A CORPORATION OF OHIO

AUTOMATIC MULTIPLE SPINDLE MACHINE

Application filed December 24, 1930, Serial No. 504,540, and in Germany August 30, 1930.

This invention relates to an automatic multiple spindle screw machine having improved means for automatically adjusting the length of the work bar or stock, one of the objects of the invention being to provide an improved stock stop carried by the tool slide and operative during the indexing of the work spindle carrier.

A further object of the invention is the provision of an improved multiple spindle screw machine in which, during the indexing of the work spindle carrier, the stock bar or rod may be automatically fed against a stock stop supported in the rear of the front face of the tool carrier and at one side thereof and operative during such indexing to limit the feed of the work and the work chucked during such indexing, whereby a material saving in time in the operation of the machine results.

In the present improvement, the advance or feed of the stock bar to the required length is accomplished during the indexing of the work spindle carrier so that, immediately after the automatic locking of this carrier, the work can commence, thus resulting in a material saving of time and the consequent speeding up of the work. This is obtained by means of an improved adjustable stop fastened to the main tool slide and so located opposite the work spindle carrier that the rod or bar can be advanced an exact length of feed between two working positions of the spindle carrier, thus expediting the operation of the machine.

This stock stop preferably consists of a plate which may be fastened to a shaft or bracket of the tool carrier slide and adjustable longitudinally relatively thereto so that the time required for chucking and advancing the material can be utilized during the indexing of the spindle carrier, thus giving more time available for the operation on the work. Thus, it is possible to use a reduced feed, or in case of a normal feed, obtain greater production.

Another advantage of the present improvement is that the space under the tool slide remains entirely free and unobstructed so that the shavings can fall unhindered through the frame into the pan.

In some of the old multiple spindle screw machines, the shaft for the swinging stock stop was located at the side or below the frame of the machine with the operating means therefor built in the space under the sliding tool carrier, thereby preventing the shavings from falling freely through the frame into the pan and this construction also obstructed the view of the working tools. In other old machines, the stock stop was located near or almost in the circumference of the working spindles, requiring a side stop operating mechanism which prevented an open construction of the machine.

One of the advantages of the present improvement is that the stop plate serves as a stop and a guide surface as well, and can be attached to the side of the main tool slide so that the space between this stop plate and the tool holders is considerable with the result that the stop plate can be made large enough to permit the material to be advanced to the stop during the full index time of the work spindle carrier.

This improved stop permits the opening and closing of the tension collets operated by a cam drum to be effected by means of a slide and slide bracket attached to a surface of the machine, the slide having on the inner surface a toothed-shaped shoe to engage with the spool of the chucking mechanism on the work spindle when the spindle carrier is indexed and the feed slide operated by this cam drum engaging the feeding tube can have a shaft to support the chuck operating slide and which is fastened to the guide bracket on the upper section of the feed slide.

A four spindle automatic bar machine is illustrated in the accompanying drawings and comprises in a general way an indexible work spindle carrier, and a sliding tool carrier together with operating means therefor.

In the drawings accompanying and forming a part of this specification.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

This improved machine which is entirely automatic, comprises a frame or base 1 having two upright housings 2 and 3 and a top bracket 3a connecting the two upright housings. In the housing 2 is located the work spindle carrier 4 having a Geneva or similar movement for indexing it, not shown. This work spindle carrier 4 carries four rotating work spindles 5, 6, 7 and 8, located concentrically to its axis and this work carrier is stopped and locked at every quarter index of the spindle carrier, one after the other, in the various positions I, II, III and IV, opposite the corresponding working tools carried by the tool slide and which engage the work until the work is completed. The driving power for the four rotatable work spindles is furnished by a center drive shaft 11, passing through a hollow spindle carrier extension 10, (see Fig. 1) having a gear 12 in mesh with gears 13, 14, 15 and 16, one carried by each work spindle. The work spindle carrier extension or sleeve 10 forms a bearing or support for the main tool slide 17, shown, of square shape, and provided with T-slots 18 at the four corners for fastening and locating the various tool holders. This tool slide 17 on the tubular extension 10 makes it possible to fasten or secure the individual tool holders in relation to the four working spindles 5 to 8. The tool slide 17 carries on one side and projecting from the front end located perpendicularly to the front face of the work spindle carrier, a shaft 19 having a more or less rectangular and curved flange or plate 20 (see Fig. 2) forming a stock stop for the work rods. The front face of this stop 20 is located at a fixed distance from the work spindle carrier to limit the feeding of the work rods while the spindle carrier is being indexed from the III position to the IV position and thus the exact length of the advanced work bar or rod is determined.

Figure 3:
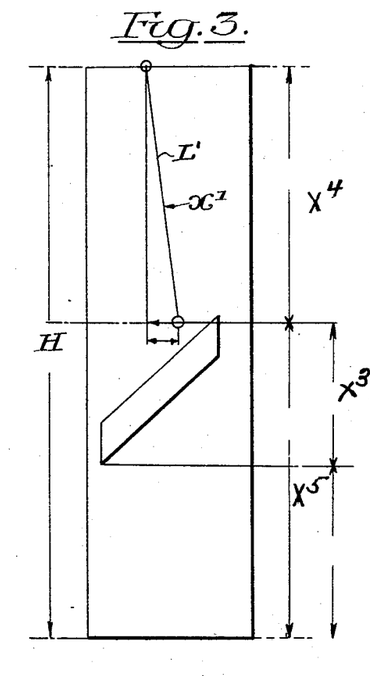
Figs. 3 and 4 are diagrammatic comparison views illustrating the difference between the cams and cam drums of a swinging stock stop of the old form and of the present improved stock stop fastened to the main tool slide.
Figure 4:
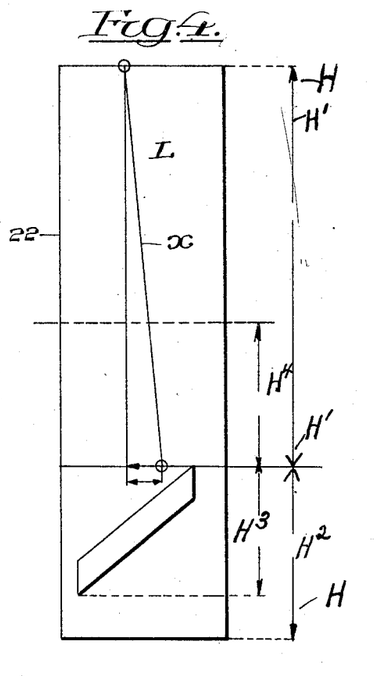

The axial shifting of the tool slide 17 is obtained by means of a roller 21 co-operating with a cam $x$ on the main tool slide cam drum 22 secured to a rotatable cam shaft 23 supported by bearings in the frame housings of the machine. This cam drum 22, shown in detail in Fig. 4, has a total circumference indicated by "H". "H'" indicates the working range, "H$^2$" illustrates the idle space and "H$^3$" illustrates the space and idle movement for the chucking and feeding arrangement. The importance of this development is shown in Fig. 3, illustrating the old operation for feeding the material. When comparing these figures, it will be seen that in the case of the drum in Fig. 4, the length of the cam $x$ is considerably longer on the cam drum and, therefore, extends through the distance H' which is about one-third greater as H$^4$ than the cam illustrated by $x'$ in Fig. 3, while the line $x^3$ represents the insertion, idle and feeding time for the work. The angle L' of the cam $x'$, Fig. 3, is shorter than the angle L of the cam $x$ illustrated in Fig. 4, so that the latter cam $x$ will operate more easily which will, of course, permit the cam drum 22 to be rotated at a higher speed and also a finer feed action of the main tool slide 17. For instance, the working cam $x'$ of Fig. 3, has up to the present, represented only about one-half of the total circumference of the main cam drum 22, in the case of work which took two seconds to finish, one second of this time being consumed in actual operation as $x^4$, and the other in idling time $x^5$. In the present improvement, however, with a fixed work stop between positions III and IV, one and one-half seconds of the working time H' will be consumed, as in Fig. 4, while the idling time H$^2$ and H$^3$ is reduced to half a second.

Figure 1:
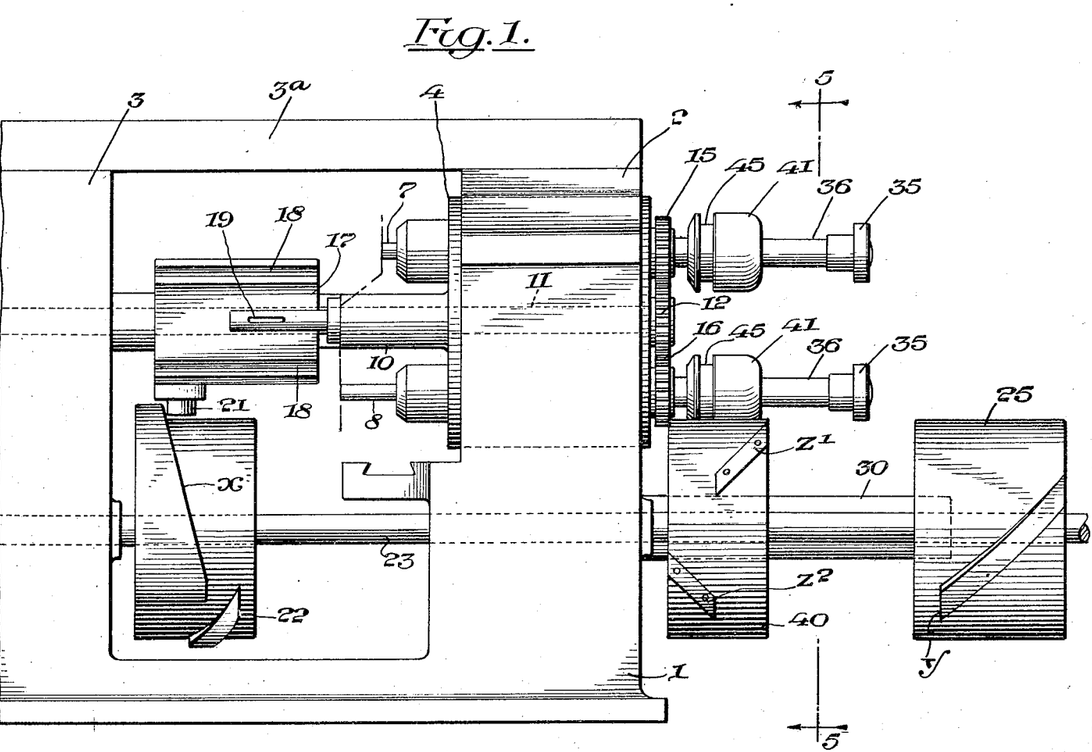
Fig. 1 is a side view of so much of this improved machine as is necessary to illustrate the improvement, illustrating, however, the work chucking cam drum and the material feeding cam drum.
Figure 2:
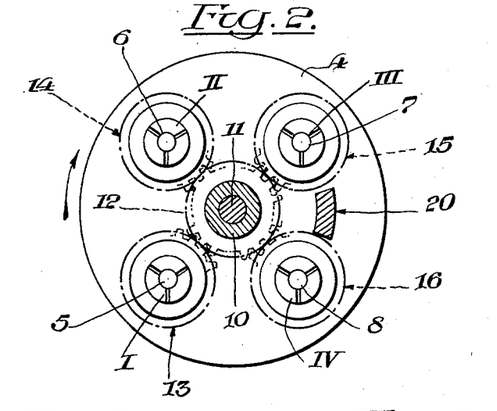
Fig. 2 is a detail front view partly in section of the work spindle carrier with the four work spindles illustrated in their four operating positions, I, II, III and IV, the fixed stock stop device being shown in section between positions III and IV.

During the indexing of the work spindle carrier from the III position to the IV position, the operation of advancing the bar material is taking place and this is controlled by the cam drum 25, Fig. 1, on the end of the cam shaft 23, projecting from the housing 2. This cam drum 25 carries a cam Y on its circumference, which operates a feed slide 28 through a cam roller 27, (see Fig. 6).

Figure 6:
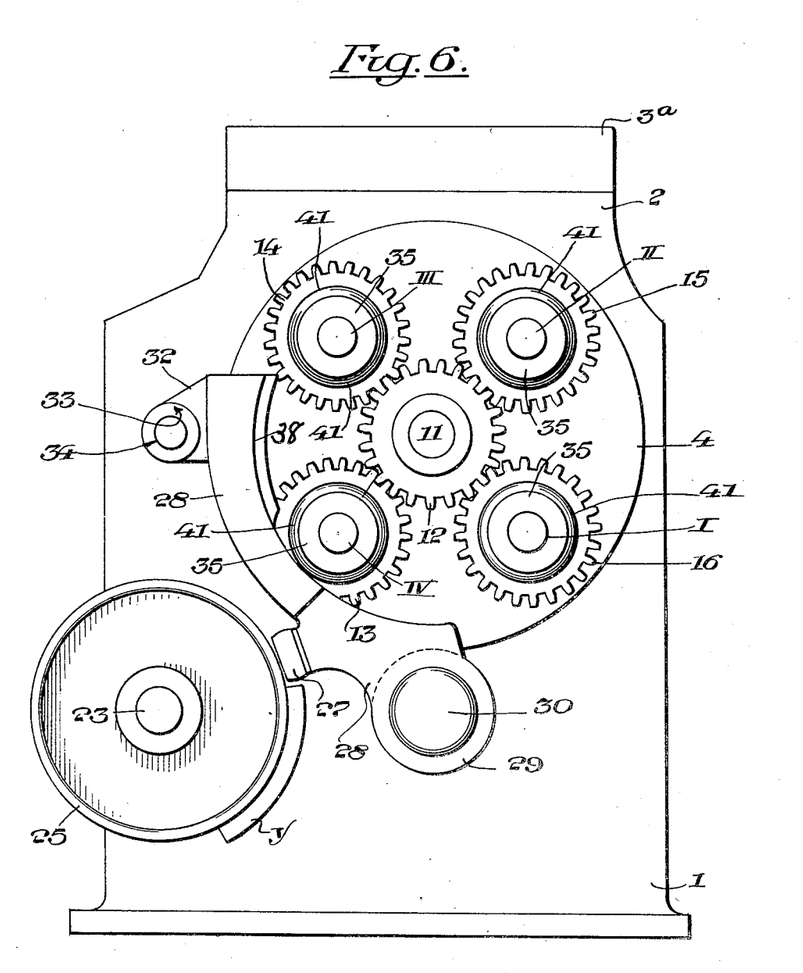
Fig. 6 is a similar end view of the machine illustrating the feeding mechanism with the feeding means operated by the feeding cam drum and feed slide co-operating with the feed tubes.
Figure 7:
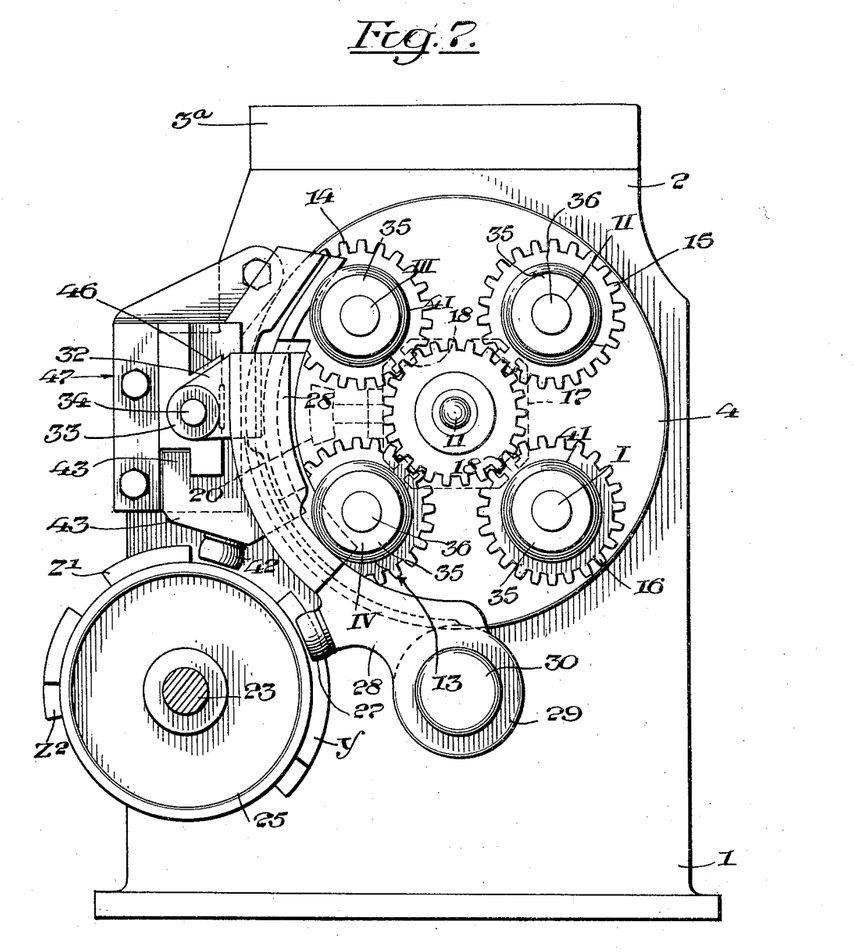
Fig. 7 illustrates a similar end view, illustrating both the feeding and chucking means shown in Figs. 5 and 6.

The feed slide 28 is segmentally formed with a bearing 29 sliding on the shaft 30. The feed slide 28 is supported and guided by a shaft 34 carried by a boss or hub 33 of a support or bracket 32. On the inner side of the feed slide 28 is a curved shoe 38 located to engage the feed operating spool 35 of the tube 36, so that when the spindle carrier is indexing, the spindle spool 35 originally located in III position comes in contact with the shoe parts 38 and 39 of the feed slide 28, whereby during the indexing of the work cylinders, the work bar is shifted forward in the direction of the main tool slide 17.

Figure 5:
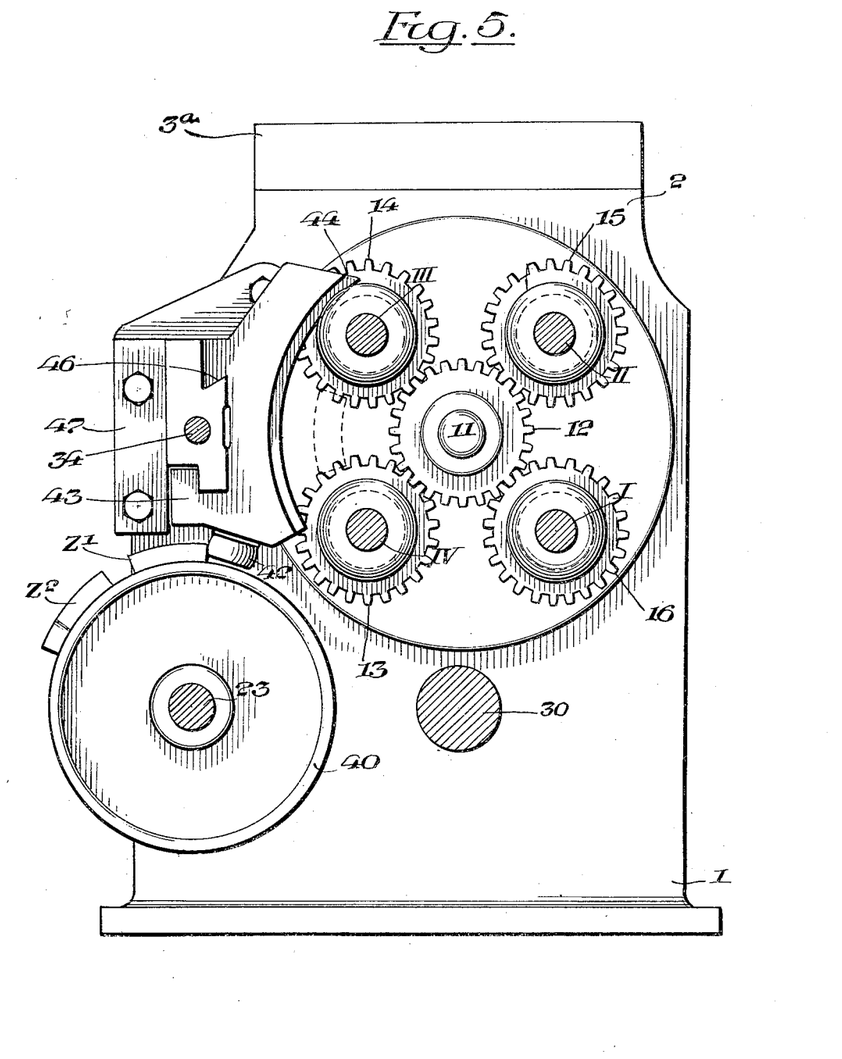
Fig. 5 is an end partly sectional view of the machine taken on the line 5—5 of Fig. 1, and is especially intended to show the material chucking means and cam drum and shows the opening and closing chucking slide with its chucking tooth or shoe.
Figure 8:
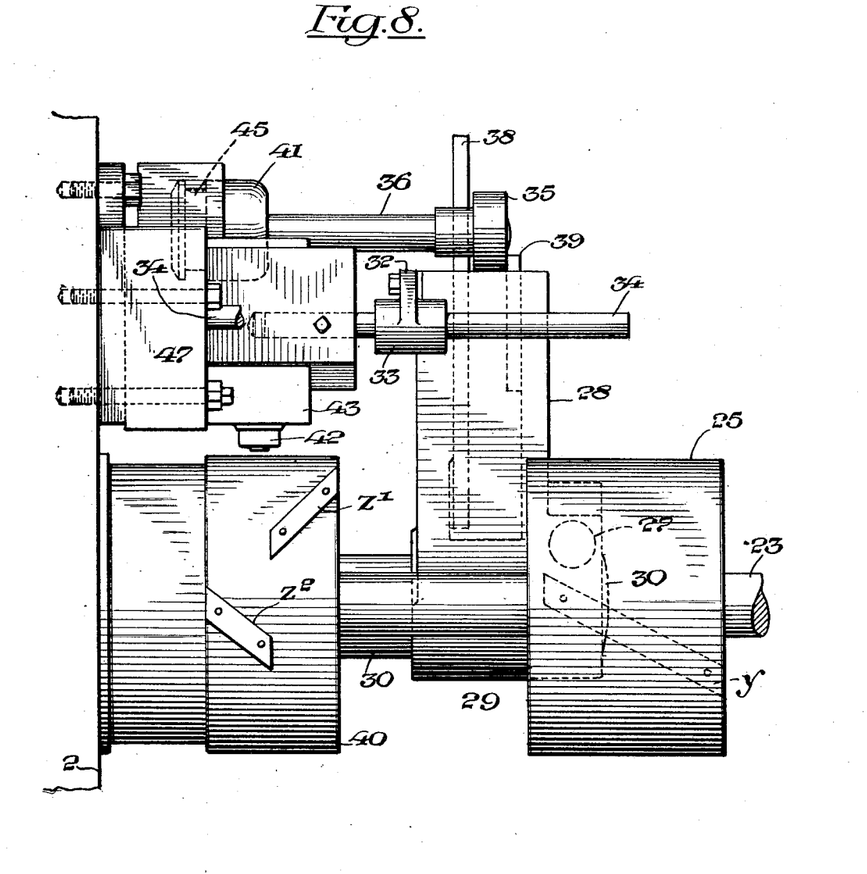
Fig. 8 is a side view of Fig. 7.

During this same period of indexing from the III to IV positions, the opening and closing of the collet to hold the bar stock is controlled through a cam drum 40, Figs. 1, 5 and 8 located on the cam shaft 23 between the housing 2 and the feed cam drum 25. On the circumference of this cam drum 40 are located two cams $Z^1$ and $Z^2$ for opening and closing the chuck operating spool 41. The closing of the chuck takes place immediately after the full advance of the bar material against the stock stop. These cams $Z^1$ and $Z^2$ come in contact with the roller 42 attached to a slide 43. This slide is curved radially around the working spindle and carries a tooth-shaped shoe 44 which engages in a groove of the chuck operating spool 45 and can be operated at any time during the index operation, because this chucking shoe 44 engages the groove 45 during the index period. This slide 43 slides on a dovetailed shaped guide 46 fastened to the housing 2 by a boss 47.

From the foregoing, it will be seen that during the indexing of the work spindle carrier which idle time has been lost heretofore, the stock rods or bars are fed forward to engage the work stop and these bars chucked, this all occurring during the indexing of the work spindle carrier from the III to the IV positions thereof instead of, as heretofore, accomplishing this work after the work spindle carrier has been completely indexed and locked. It will be understood, of course, that prior to the indexing of the work spindle cylinder, the sliding tool carrier has been shifted backward to free the tools from the work, this tool slide only moving back far enough to clear the work, it being held in that position until the stock is advanced and held by the collars, and that during this time, the indexing of the work spindle carrier takes place so that the work stop is in a fixed position during the feeding of the bars through the work spindles. Consequently, it will be seen that the idle time of the machine, to wit, indexing of the work spindle carrier, is now utilized to perform certain necessary operations, thus materially speeding up the production of the work.

By locating the fixed stop between the third and fourth position of the work spindle carrier, it may be located on the frame since, in this position, it does not catch the chips for the reason that a threading tool or similar tool producing but a very small quantity of chips is usually located in the third position of the machine. However, in the present instance, it is shown carried by the reciprocating tool slide. Furthermore, by locating the fixed stop between the third and fourth position, twenty-five percent longer cams can be used on the cam drum of the cam shaft, whereas, with the forms of stops used in prior machines, the cams could only be one-half the circumference of the cam drum so that, for a piece which took two seconds to produce, one second would be working time and one second idle time. However, with the present improvement in which the stock is fed during the indexing of the work spindle carrier, the working time may be a second and a half and the idle time only half a second since, as hereinbefore stated, the stock is fed during the indexing of the cylinder. Thus, there is a material saving in time and consequently a considerable reduction in the cost of manufacture of the product.

When the fixed stop is carried by the reciprocating tool slide, the stock is fed during the indexing of the work spindle carrier into position to engage this stop at the time when the tool slide has reached its extreme rearward or backward position and is idle and, therefore, before it commences to move toward the work carried by the work spindle carrier.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In an automatic multiple spindle machine, the combination of a tool carrier and a work spindle carrier, one having a sliding movement relative to the other, and one having an indexible movement relative to the other, the combination of a work stop carried by the tool carrier and in position and operative during the indexible movement of the indexible carrier to limit the forward feed of the stock, and means for pushing and thereby feeding the stock into engagement with the work stop.

2. In an automatic multiple spindle machine, the combination of a tool carrier and a work spindle carrier, one having a sliding movement relative to the other, and one having an indexible movement relative to the other, the combination of a work stop carried by the tool carrier and in position and operative during the indexible movement of the indexible carrier from the third to the fourth positions thereof to limit the forward feed of the stock, and means for pushing and thereby feeding the stock into engagement with the work stop.

3. In an automatic multiple spindle machine having a tool carrier and an indexible work spindle carrier, the combination of a stock stop carried by the tool carrier and operative during the indexing of the work spindle carrier to limit the forward feed of the stock, and means for pushing and thereby feeding the stock into engagement with the work stop.

4. In an automatic multiple spindle machine having a sliding tool carrier, the combination of a work stop carried thereby, an indexible work spindle carrier having rotary work spindles, and means for pushing and thereby feeding the work through the spindles during the indexing of the carrier into position to be engaged by the stop.

5. In an automatic multiple spindle machine having a sliding tool carrier, the combination of a work stop carried thereby, an indexible work spindle carrier having rotary work spindles, means for pushing and thereby feeding the work through the spindles during the indexing of the carrier into position to be engaged by the stop, and means for chucking the work during the indexing of the carrier.

6. In an automatic multiple spindle machine having a sliding tool carrier, the combination of a stock stop fastened and adjustable relatively to the sliding tool carrier, an indexible work spindle carrier having rotary work spindles, and means for pushing and thereby feeding the stock through the spindles into position to engage the stock stop during the indexing of the work carrier.

7. In an automatic multiple spindle machine having a sliding tool carrier, the combination of a stock stop fastened and adjustable relatively to the sliding tool carrier, an indexible work spindle carrier having rotary work spindles, means for pushing and thereby feeding the stock through the spindles into position to engage the stock stop during the indexing of the work carrier, and means for chucking the work during the indexing of the work carrier.

8. In an automatic multiple spindle machine having a sliding tool carrier, the combination of a stock stop fastened and adjustable relatively to the sliding tool carrier, an indexible work spindle carrier having rotary work spindles, means for feeding the stock through the spindles into position to engage the stock stop during the indexing of the work carrier, said work feeding means comprising a cam shaft, a cam drum located thereon, and a sliding shoe shifted by said cam drum and in position to engage the feeding means of the work spindle carrier.

9. In an automatic multiple spindle machine having a sliding tool carrier, the combination of a stock stop fastened and adjustable relatively to the sliding tool carrier, an indexible work spindle carrier having rotary work spindles, means for feeding the stock through the spindles into position to engage the stock stop during the indexing of the work carrier, and means carried by the spindles for chucking the work during the indexing of the work carrier said chucking means comprising a cam shaft, a cam drum mounted thereon, and a sliding shoe operated by said cam drum and in position to engage the chuck operating means during the indexing of the work carrier.

10. In an automatic multiple spindle machine, the combination of a sliding tool carrier, a work stop carried thereby, an indexible work spindle carrier having a plurality of rotary spindles, a cam shaft, a cam drum thereon for reciprocating the tool carrier, another cam drum on said shaft, a sliding shoe co-operating therewith, and means carried by the work spindles and co-operating with said sliding shoe for feeding the work during the indexing of the carrier into position to be engaged by said stop.

11. In an automatic multiple spindle machine, the combination of a sliding tool carrier, a work stop carried thereby, an indexible work spindle carrier having a plurality of rotary spindles, a cam shaft, a cam drum thereon for reciprocating the tool carrier, another cam drum on said shaft, a sliding shoe co-operating therewith, means carried by the work spindles and co-operating with said sliding shoe for feeding the work during the indexing of the carrier into position to be engaged by said stop, another cam drum on said shaft, a sliding shoe co-operating therewith, and chuck operating means carried by said spindles and co-operating with said last shoe to chuck the work during the indexing of the work carrier.

12. In an automatic multiple spindle machine, the combination of a sliding tool carrier, a work stop carried thereby, an indexible work spindle carrier, a plurality of work spindles carried by said carrier, feeding means for the work, chucking means for the work, a cam shaft, a series of cam drums carried thereby, one operative to reciprocate the tool slide, another operative to feed the work during the indexing of the work spindle carrier into position to engage the stock stop, and another operative to chuck the work during such indexing.

13. In an automatic multiple spindle machine, the combination of a sliding tool carrier, a stock stop carried thereby, an indexible work spindle carrier, an extension projecting from one carrier into the other carrier, a series of rotary work spindles carried by the work spindle carrier, and means for feeding the work through the spindles during the indexing of the carrier into position to be engaged by the stock stop.

14. In an automatic multiple spindle machine, the combination of a sliding tool carrier, a stock stop carried thereby, an indexible work spindle carrier, an extension projecting from one carrier into the other carrier, a series of rotary work spindles carried by the work spindle carrier, means for feeding the work through the spindles during the indexing of the carrier into position to be engaged by the stock stop, and means for chucking the work.

15. In an automatic multiple spindle machine, the combination of a sliding tool carrier and a work stop carried thereby and operative when the tool carrier has reached its rearward position and during the indexing of the work spindle carrier.

16. In an automatic multiple spindle machine, the combination of an indexible work spindle carrier provided with a series of work spindles and a reciprocating tool slide, and a fixed stock stop located between the third and fourth positions of the work spindle carrier and operative during the indexing movement of the work spindle carrier.

17. In an automatic multiple spindle machine, the combination of an indexible work spindle carrier provided with a series of work spindles and a reciprocating tool slide, and a stop carried by the tool slide and located between the third and fourth positions of the work spindle carrier and operative during the indexing movement of the work spindle carrier.

18. In an automatic multiple spindle machine, the combination of a work spindle carrier provided with a series of work spindles and a tool carrier, one indexible relative to the other and one sliding relative to the other, and a fixed stop supported in the rear of the front face of the tool carrier and operative during the indexing movement of the work spindle carrier.

19. In an automatic multiple spindle machine, the combination of a work spindle carrier provided with a series of work spindles and a tool carrier, one indexible relative to the other and one sliding relative to the other, and a fixed stop supported in the rear of the front face of the tool carrier and located between the third and fourth positions of the work spindle carrier and operative during the indexing movement of the work spindle carrier.

Signed at Cleveland, Ohio, this 14th day of November, 1930.

OLOF ENOCH TROBECK.